May 26, 1970    M. BROMBERG    3,514,139
COUPLING
Filed Nov. 6, 1967
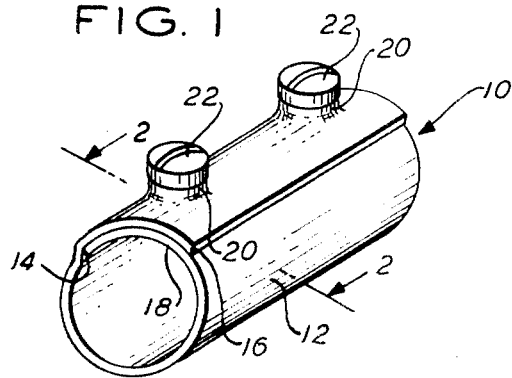
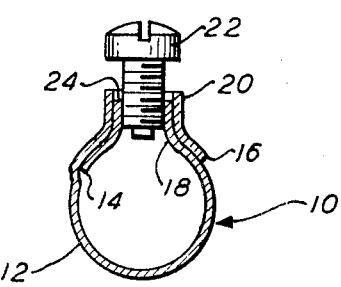
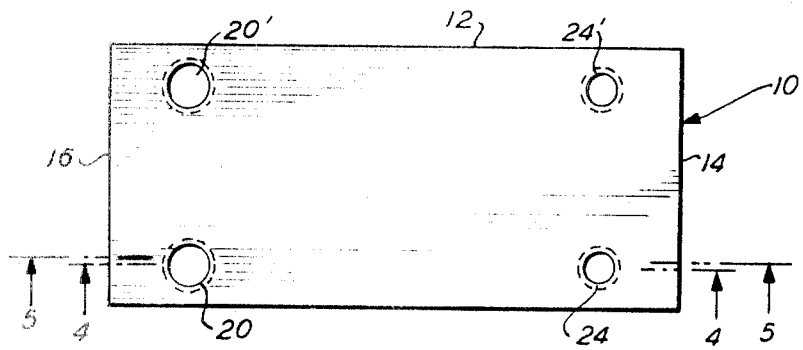
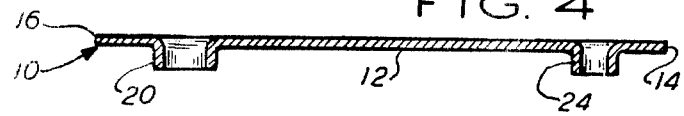
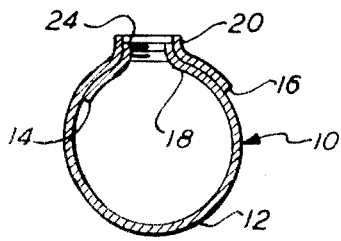
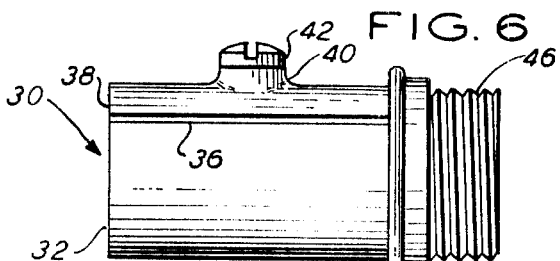
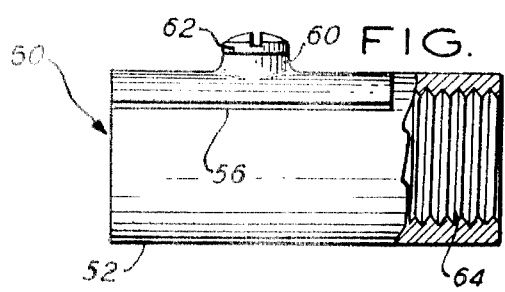
INVENTOR
MENASHE BROMBERG
BY
ATTORNEY 3,514,139
COUPLING
Menashe Bromberg, West Orange, N.J., assignor to The Thomas & Betts Co., Elizabeth, N.J., a corporation of New Jersey
Filed Nov. 6, 1967, Ser. No. 680,667
Int. Cl. F16b 1/00
U.S. Cl. 287—118                                   8 Claims

ABSTRACT OF THE DISCLOSURE

The invention is directed to coupling devices for coupling a plurality of members together. These members may be tubular or rectangular and tubes, may be rods, hose, or the like. The basic coupling structure involves a portion of rigid material which has been formed into a cylinder to accept members to be coupled either internally or externally of the surface of the cylinder. A portion of the surface of the cylinder is allowed to overlap providing an overlap region. Apertures are extruded through both the inner and outer portions of the overlap region forming extruded holes therethrough with interacting hubs. The hub of the inner portion which has been extruded through and captured by the hub of the outer portion is threaded to admit a set screw which will be used to capture the member, or members, to be coupled. The various embodiments of the device permit the direct coupling of two, for example, rigid raceways by means of separate set screws on the coupling itself. Additionally, one end of the coupling may be provided with such a set screw arrangement, as described, while the other portion is either internally or externally screw-threaded to accept members having threaded fittings.

BACKGROUND OF THE INVENTION

Field of the invention

The invention is applicable to the field of coupling members whether they be solid rods, hollow tubes, flexible tubing or the like for use in the joining of electrical conduit or for the coupling of fluid transmitting lines. The coupling is equally suited to the field of coupling rigid or flexible metallic raceways for running electrical wiring and to the coupling of fluid lines for the transmission of various fluids.

Description of the prior art

Prior art coupling devices for coupling tubular members generally were formed of a planar member which had been formed into a cylindrical shape having an overlap region. Prior to the forming of the cylinder, however, a number of holes were placed along two parallel edges of the coupling blank. Each of these holes was then threaded according to the size of the set screw which was later to be placed therein. Now the blank was formed to create the cylinder having the overlap region and attempts were made to align the threaded aperture on the inner portion of the overlap region with the threaded aperture in the outer portion of the overlap region. The set screw was then inserted into the screw threads in the outer portion of the overlap region and tightened to enter the screw threaded aperture in the inner portion of the overlap region. If the apertures, or holes, of the inner and outer portions of the overlap region were not in correct alignment, cross-threading of the threaded portions of the holes would be effected. This would prevent either the complete tightening of the set screw against the member inserted within the coupling device or would lead to the destruction of the threading so that it would be impossible to remove the set screw and thereby separate the members which are joined thereby. Further, the threading on both apertures resulted in a certain degree of separation between the outer and inner portions of the overlap region as the set screw was tightened thereby greatly reducing the effect of the force transmitted by the set screw and employed to couple the members. Further, the act of tightening the set screw may cause the inner and outer portions of the overlapped area to translate with respect to one another thereby causing cross-threading and the problems described above with regard to original misalignment.

SUMMARY OF THE INVENTION

The invention consists of a coupling device formed from a planar blank of material, which prior to forming into a cylinder for receipt of the members to be coupled, has apertures extruded therein forming extruded holes and hubs about each of the holes. The extruded holes and hubs formed along a first edge of the coupling blank are larger than the extruded holes and hubs formed along the second parallel edge of the coupling blank. Upon forming of the coupling blank into a cylinder, such that it will accept the members to be joined therein, the forming is done in such a manner that the hubs of the smaller extruded holes will be aligned with the hubs and holes of the larger extruded holes. A force fit will then cause the hubs of the smaller extruded holes to enter the hubs of the larger extruded holes and be captured thereby. The smaller hub of the inner portion of the overlap region is then threaded which will increase the capture of the inner hub with respect to the outer hub and will also provide a single threaded portion for receipt of the set screw. The set screw may then be placed within the threaded portion and tightened up upon the members placed within the coupling. Because of the capture of the inner portion of the overlap area by the outer portion of the overlap region separation between the two portions of the overlap region cannot take place and thus all the force imparted to the set screw will in turn be applied to the member placed within the coupling and none will be dissipated by the unwanted separation of the two portions of the overlap region. Additionally, since only a single threaded area is involved with the set screw the chance of cross-threading, which would impede the operation of the coupling device is greatly reduced and minimized.

The same arrangement can be used at both ends of the coupling device so that tubular members inserted from both ends may be joined by means of set screws. Alternatively, one end of the coupling device may be provided with a set screw arrangement while the other end is provided with either internal or external screw threads to permit the coupling of tubular members with other screw-threaded fittings. It is therefore an object of this invention to provide an improved form of coupling device.

It is still another object of this invention to provide an improved form of coupling device wherein all the force transmitted to a set screw used for coupling is transmitted directly to the member to be coupled and none is lost by the unwanted translation of one portion of the coupling device with respect to another.

It is still another object of this invention to provide an improved form of coupling device wherein the respective portions thereof remain joined during use by the novel interaction of extruded and overlapping holes and hubs.

It is yet another object of this invention to provide an improved coupling device which minimizes the possibility of cross-threading between a set screw used to couple the coupling device to the members to be coupled.

It is still another object of this invention to provide an improved coupling means having extruded holes wherein the extrusions are used to join the portions of the coupling device together.

Other objects and features of the invention will be pointed out in the following description and claims and illustrated in the accompanying drawings, which disclose, by way of example, the principle of the invention, and the best modes which have been contemplated for carrying it out.

BRIEF DESCRIPTION OF THE DRAWING

In the drawings:

FIG. 1 is an isometric view of a coupling device constructed in accordance with the concepts of the invention;

FIG. 2 is a sectional view of the coupling device of FIG. 1 taken along the lines 2—2;

FIG. 3 is a plan view of a coupling blank for forming the device of FIG. 1;

FIG. 4 is a sectional view of the blank of FIG. 3 taken along the lines 4—4 and showing the blank after the extrusion of the holes and hubs therein;

FIG. 5 is a sectional view of the blank of FIG. 3 taken along the lines 5—5 and showing the blank in the condition where the coupling cylinder has been formed and the hubs have been joined;

FIG. 6 shows an alternative embodiment of the coupling device of FIG. 1;

FIG. 7 shows a further alternative embodiment of the device of FIG. 1; partly in section to show internal details.

Similar elements will be given similar reference characters in each of the respective drawings.

DESCRIPTION OF THE PREFERRED EMBODIMENTS

Turning now to FIG. 1 there is shown an isometric view of the coupling device 10 constructed in accordance with the concept of the invention. The coupling device 10, formed from a coupling blank 12, as will be described below with respect to FIGS. 3 through 5, has a first edge 14 and a second edge 16. When the coupling device 10 is formed from the blank 12 it is formed in such a manner as to form a cylinder for acceptance therein of the members to be joined. Edges 14 and 16 are permitted to overlap in such a manner as to form an overlap region 18 therebetween. The overlap region 18 from the edge 14 and on the inner portion of the coupling will be termed the inner portion of the overlap region whereas the outer surface from edge 16 will be termed the outer portion of the overlap region 18. Hubs 20 are formed when the holes in the outer portion of the overlap region are formed as will be described below. Set screws or other fasteners 22 are placed within the hubs 20 and cooperate with the threaded portions of the inner hubs to be described.

Turning now to FIG. 2 there is shown an end view of the coupling device 10 of FIG. 1 taken along the lines 2—2 of FIG. 1. From this figure the relationship of the overlapped portions and their respective hubs can be appreciated. As can be seen from FIG. 2 the hub 24 formed about the extruded hole in the inner portion of the overlap region 18 has been positioned in the extruded hole and hub 20 of the outer portion of the overlap region 18. As will be set forth in greater detail with respect to FIGS. 3 to 5, the dimensions of the holes and hubs 20 and 24 are so chosen, that the force fitting of hub 24 within hub 20 will cause hub 24 to be captured by hub 20 preventing separation of the inner and outer portions of the overlap region. The hub 24 and aperture of the inner portion are then threaded and a set screw or other fastening device 22 is screwed into the threaded portion of the hub 24. The tapping of hub 24 tends to expand it to increase the capture of hub 24. Alternatively, the tapping could cause the required capture absent the force fitting of hubs 20 and 24. Tapping may be accomplished by any conventional tapping device including self-tapping metal screws.

As was described above, the separation of the two portions of the overlap region 18 causes the dissipation of a great deal of the torque applied to the fastening device 22 reducing the coupling force. Such separation is not possible in the instant device because of the capturing of the hub 24 and aperture of the inner portion by the hub 20 and aperture of the outer portion. Further, since only the hub 24 of the inner portion is threaded the problems of cross-threading due to misalignment of the apertures or due to the relative movement of the inner and outer portions of the overlap region 18 during tightening or removal of the set-screw 22 is eliminated.

Turning now to FIG. 3, a general description of the manner in which the coupling device 10 is fabricated will be set forth. The coupling device 10 is fabricated from a planar blank 12 having a first edge 14 and a second edge 16. Spaced in from the edge 16 there are placed center positions 20' for the extruded hubs 20 and holes to be formed in the outer portion of the overlap region 18 to be created when the blank 12 is formed into a cylinder. Spaced in from edge 14 are center points 24' which are the locations of the hubs 24 to be extruded in the inner portion. In FIG. 4 there is shown a first step in the forming operation showing a section along the lines 4—4 of FIG. 3. A punch or similar device (not shown) is used to extrude the hubs 20 and 24 and form the apertures therein. It can be seen that the extruded hubs 20 and apertures have been formed at the locations 20' while the extruded hubs 24 and apertures therein have been formed at the locations 24'. It should be noted that the hubs 20 and their associated holes are larger than the hubs 24 and their associated holes.

Turning now to FIG. 5 there is shown a front view in section of the coupling blank 12 of FIG. 3 taken along the lines 5—5. As can be seen from the figure the coupling blank 12 has been formed into the cylinder and the overlap region 18 formed between the edges 14 and 16. Further, the hub 24 of the inner portion of the overlap region 18 has been inserted within the aperture in the hub 20 of the outer portion of the overlap region 18. In order that a tight fit be provided and that the inner hub 24 be captured by the outer hub 20 the dimensions of the holes are chosen to provide a tight fit and the coupling of the hubs is achieved by a force fit. Alternatively, it is possible to cause the expansion of the inner hub 24 during the tapping operation wherein the aperture within the hub 24 is tapped to accept the set screw 22. Even in the arrangement wherein forced fitting is used to cause capture of the hubs, the tapping of the inner hub 24 will cause additional seizure of the two hubs to result. Additionally, a punch could be used to assure capture of the hubs. The punch would be applied to the hub 24 after it was placed in hub 20. Its effect would be to flare the hub 24 into intimate contact with hub 20 assuring a good force fit. A set screw 22, not shown in FIG. 5, may be now inserted into the threaded portion of the hub 24 for assembly of the members to be joined.

Turning now to FIG. 6 there is shown another form of the device of FIG. 1. In this arrangement coupling device 30 is formed from a blank 32 and has an overlap region 38 and one of the edges 36 is visible in the figure. Hub 40 will be raised in the outer portion of the overlap region with a corresponding hub in the inner portion not visible in the figure. A set screw or fastening device 42 will be placed within the threaded portion of the inner hub, not visible in the figure. At the right end of the coupling there is found a threaded portion 46 which may be formed from the original overlapped portion but with the edges caused to butt one another or may be formed in a two-part coupling blank a first portion of which is the planar portion arranged to be placed in the overlap arrangement shown to the left of the figure and the second a preformed tubular member. In the latter case when the planar portion of the coupling device 30 has been formed, the edges common with the edge of the tubular portion will be joined by welding, brazing or the like. The seam will be protected by a raised portion 44 to act as a stop for a locking nut 48 placed upon the threaded portion 46. A coupling as shown in FIG. 6 permits the coupling of diverse types of members.

The coupling member 50 of FIG. 7 is constructed in the manner similar to the coupling member 30 of FIG. 6. However, in this instance the right end of the coupling device 50 is provided with an internal screw thread as at 64 to receive tubular members having external threads or fittings having external threads.

It should be noted that many variations of the basic coupling can be achieved in order to couple diverse types of members. Additionally, although only a two set screw coupling device has been shown in FIG. 1 as many set screws may be arranged along the length of the coupling device as are desired. Further, the coupling device may be made as long or as short and in a diameter as is required for the particular members to be joined.

While there have been shown and described and pointed out the fundamental novel features of the invention as applied to the preferred embodiments, it will be understood that various omissions and substitutions and changes of the form and details of the devices illustrated and in their operation may be made by those skilled in the art without departing from the spirit of the invention.

The embodiments of the invention in which an exclusive property or privilege is claimed are defined as follows:

1. A coupling for joining two members comprising: a planar member having first and second edges, formed into a cylinder with a first of said edges in overlapped relationship with the second of said edges causing an overlap region therebetween; said overlap region having an outer portion and an inner portion; at least one aperture in said outer portion; at least one aperture in said inner portion aligned with said aperture in said outer portion; a first hub about said aperture in said outer portion, said first hub having an inner wall disposed radially outwardly of the longitudinal axis of said cylinder; and a second hub about said aperture in said inner portion, said second hub having an outer and inner wall disposed radially outwardly of the longitudinal axis of said cylinder; said second hub extending into said first hub in telescoping relationship thereto, wherein said outer wall of said second hub is adjacent to said inner wall of said first hub, said walls communicating in a plane substantially normal to the longitudinal axis of said cylinder, said aperture in said inner portion being positioned within said aperture in said outer portion; said inner wall of said second hub being threaded to receive set screw means engaging said threaded inner wall in said inner portion and disposable in discrete positions to engage members inserted into said coupling.

2. A coupling for joining two members as defined in claim 1, wherein said second hub about said aperture in said inner portion and said first hub about said aperture in said outer portion are extruded from said planar member.

3. A coupling for joining two members as defined in claim 1, wherein there are two apertures in each of said inner and outer portions and hubs formed about each aperture.

4. A coupling for joining two members as defined in claim 2, wherein said first and second edges meet in butting relationship at one end of said coupling and the outer surface of said formed planar member is threaded.

5. A coupling for joining two members as defined in claim 2, wherein said first and second edges meet in butting relationship at one end of said coupling and the inner surface of said formed planar member is threaded.

6. A coupling for joining two members comprising: a first body portion of generally circular cross section at a first end and a second body portion of generally circular cross section at a second end, said second body portion being formed with an overlap region having an outer portion and an inner portion; at least one aperture in said inner portion aligned with said aperture in said outer portion; a first hub about said aperture in said outer portion, said first hub having an inner wall disposed radially outwardly of the longitudinal axis of said second body portion; and a second hub about said aperture in said inner portion, said second hub having an outer and inner wall disposed radially outwardly of the longitudinal axis of said second body portion; said second hub extending into said first hub in telescoping relationship thereto, wherein said outer wall of said second hub is adjacent to said inner wall of said first hub, said walls communicating in a plane substantially normal to the longitudinal axis of said second body portion, said aperture in said inner portion being positioned within said aperture in said outer portion; said inner wall of said second hub being threaded to receive set screw means; and set screw means engaging said threaded inner wall in said inner portion and disposable in discrete positions to engage a member inserted in said second body portion.

7. A coupling for joining two members as defined in claim 6, wherein said first body portion is externally threaded.

8. A coupling for joining two members as defined in claim 6, wherein said first body portion is internally threaded.

References Cited

UNITED STATES PATENTS

| | | | |
|---|---|---|---|
| 2,353,121 | 7/1944 | Adam et al. | 285—403 |
| 2,455,180 | 11/1948 | Kennedy | 285—417 |

DAVID J. WILLIAMOWSKY, Primary Examiner

W. L. SHEDD, Assistant Examiner

U.S. Cl. X.R.

285—419; 287—189.36